No. 872,472. PATENTED DEC. 3, 1907.
O. G. STOLZ.
FASTENING FOR RESILIENT TIRES.
APPLICATION FILED SEPT. 10, 1906.
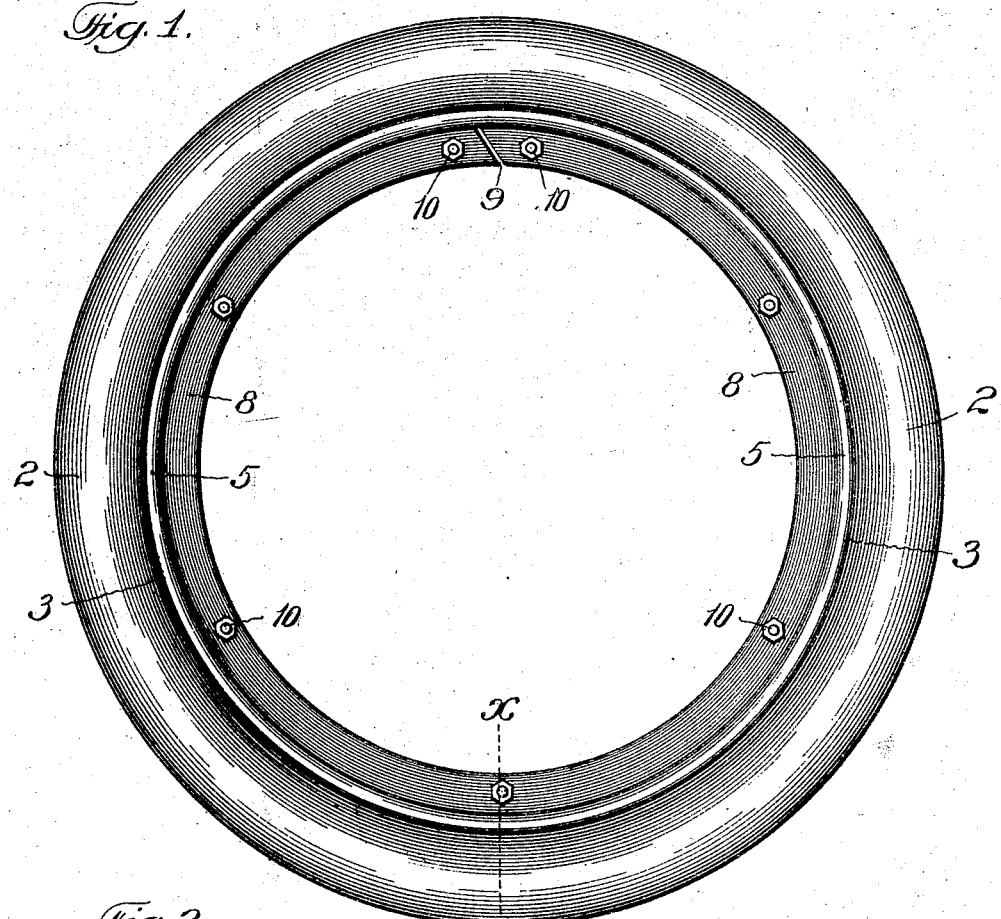
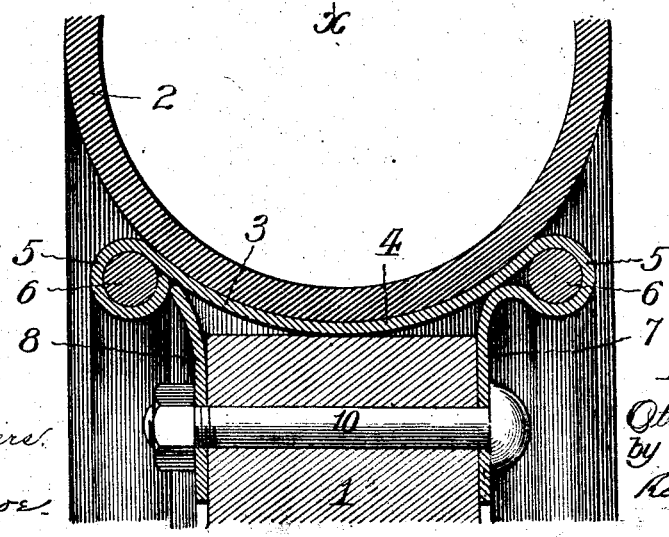

UNITED STATES PATENT OFFICE.

OTTO G. STOLZ, OF CHICAGO, ILLINOIS.

FASTENING FOR RESILIENT TIRES.

No. 872,472.  Specification of Letters Patent.  Patented Dec. 3, 1907.

Application filed September 10, 1906. Serial No. 333,918.

*To all whom it may concern:*

Be it known that I, OTTO G. STOLZ, a citizen of the United States of America, and a resident of Chicago, in the county of Cook and State of Illinois, have invented certain new and useful Improvements in Fastenings for Resilient Tires, of which the following is a specification.

This invention relates to means for securing resilient tires to wheel rims, and has for its object to provide a simple and efficient structural formation and combination of parts, whereby a strong and substantial attachment is effected, and which at the same time permits of a ready and convenient removal and replacement of the resilient tire from and upon the wheel in case of accident, etc., all as will hereinafter more fully appear.

In the accompanying drawings: Figure 1 is a side elevation of a pneumatic tire having the present attaching means applied. Fig. 2 is an enlarged detail transverse section of the same on line $x$—$x$, Fig. 1.

Similar numerals of reference indicate like parts in both views.

Referring to the drawings, 1 represents the usual solid rim or felly of the wheel, and which may be of any ordinary metal or wood construction; and 2 is the resilient tire of any usual form but preferably of the inflated ring type shown in the drawing.

The novelty of the present improvement lies wholly in the means whereby the resilient tire 2 is secured in a substantial yet readily detachable manner to the wheel rim or felly 1, and to this end comprises a construction of parts as follows:—

3 is a main ring or annulus formed of plate metal having a peripheral portion 4 of a concavo-convex form to constitute a peripheral concave or cavity for the reception of the inner part of the resilient tire 2, which may be additionally secured in place, if so desired, by rivets or other fastening means usual in the class of non-slipping tire attachments. At the respective edges or margins of the peripheral portion aforesaid, said ring or annulus is formed with hollow circular beads or rims 5, in the interior of which rings 6 are fitted to impart added strength and stiffness to the parts without an unnecessary increase in the weight of the finished article. At one side of the ring or annulus 3 the metal forming a circular bead or rim 5 is extended laterally and inwardly in the curved manner shown to constitute an attaching web 7 adapted to fit against one, and preferably the outer, side of the wheel rim or felly 1, as shown.

8 is a supplemental plate metal ring or annulus of a substantially counterpart form to that of the attaching web 7, above described, and having a like laterally and inwardly curved form as shown; such ring or annulus is adapted to fit against the other, preferably the inner, side of the wheel rim or felly 1 and having its outer edge tucked into the recess between the adjacent bead or rim 5 and the main ring or annulus for retention, and a material part of the present improvement consists in forming said ring or annulus with a split or opening 9 so that it is capable of ready contraction and expansion in the operation of slipping said ring or annulus over the axle of a vehicle, and the subsequent application in proper place on the wheel rim or felly.

10 are bolts passing through the web 7, wheel rim 1, and ring 8, to firmly secure the parts together in a readily detachable manner.

In practical use the main annulus 3, with the pneumatic or other tire in place thereon, will be slipped into place upon the wheel rim or felly 1; the supplemental annulus 8 will then be spread apart so as to pass over the axle, after which it is fitted to place as shown in the drawings, and the series of attaching bolts 10 applied to secure the parts firmly together and in a manner which will permit of a ready detachment when required in removing a punctured or disabled tire and a replacement thereof by an emergency tire carried for such purpose.

Having thus fully described my said invention, what I claim as new and desire to secure by Letters Patent, is:—

1. A resilient tire attachment comprising a main plate metal ring having a concave peripheral portion, marginal beads at the sides of said peripheral portion, and a laterally and inwardly extending attaching web, said peripheral portion, marginal beads and attaching web being integrally formed, a supplementary plate metal ring having a laterally and inwardly curved form and its outer edge tucked into the recess between the adjacent bead and the main ring for retention, and bolts passing through the parts and through the wheel rim to secure the parts together, substantially as set forth.

2. A resilient tire attachment comprising a main plate metal ring having a concavo-convex peripheral portion, marginal beads at the sides of said peripheral portion and a laterally and inwardly extending attaching web, said peripheral portion, marginal beads and attaching web being integrally formed, a supplementary plate metal ring having a laterally and inwardly curved form and its outer edge tucked into the recess between the adjacent bead and the main ring for retention and bolts passing through the parts and through the wheel rim to secure the parts together, substantially as set forth.

3. A resilient tire attachment comprising a main plate metal ring having a concave peripheral portion, hollow marginal beads at the sides of said peripheral portion and a laterally and inwardly extending attaching web, said peripheral portion, marginal beads and attaching web being integrally formed, stiffening rings fitting the interior of said hollow marginal beads, a supplementary plate metal ring having a laterally and inwardly curved form and its outer edge tucked into the recess between the adjacent bead and the main ring for retention, and bolts passing through the parts and through the wheel rim to secure the parts together, substantially as set forth.

4. A resilient tire attachment comprising a main plate metal ring having a concave peripheral portion, marginal beads at the sides of said peripheral portion, and a laterally and inwardly extending attaching web, said peripheral portion, marginal beads and attaching web being integrally formed, a split supplementary plate metal ring having a laterally and inwardly curved form, and bolts passing through the parts and through the wheel rim to secure the parts together, substantially as set forth.

5. A resilient tire attachment comprising a main plate metal ring having a concavo-convex peripheral portion, marginal beads at the sides of said peripheral portion and a laterally and inwardly extending attaching web, said peripheral portion, marginal beads and attaching web being integrally formed, a split supplementary plate metal ring having a laterally and inwardly curved form, and bolts passing through the parts and through the wheel rim to secure the parts together, substantially as set forth.

6. A resilient tire attachment comprising, a main plate metal ring having a concave peripheral portion, hollow marginal beads at the sides of said peripheral portion, and a laterally and inwardly extending attaching web, said peripheral portion, marginal beads and attaching web being integrally formed, stiffening rings fitting the interior of said hollow marginal beads, a split supplementary plate metal ring having a laterally and inwardly curved form and bolts passing through the parts and through the wheel rim to secure the parts together, substantially as set forth.

Signed at Chicago, Illinois, this 5th day of September 1906.

OTTO G. STOLZ.

Witnesses:
ROBERT BURNS,
HENRY MOE.